United States Patent [19]

Yamane et al.

[11] 3,982,878
[45] Sept. 28, 1976

[54] BURNING RATE CONTROL IN HYDROGEN FUEL COMBUSTOR

[75] Inventors: Kimitaka Yamane; Zene Ueno; Akira Morita, all of Tokyo; Tadahiko Nagaoka, Tokorozawa; Shigeo Iwaki, Akishima, all of Japan

[73] Assignee: Nissan Motor Co., Ltd., Yokohama, Japan

[22] Filed: Oct. 9, 1975

[21] Appl. No.: 621,242

[52] U.S. Cl. .................................. 431/2; 431/4; 431/12; 431/115
[51] Int. Cl.² ........................................ F23K 5/00
[58] Field of Search ............ 431/2, 4, 12, 115, 116, 431/9

[56] References Cited
UNITED STATES PATENTS

| 558,176 | 4/1896 | Huber | 431/2 |
| 3,298,785 | 1/1967 | Reul | 431/4 X |
| 3,356,600 | 12/1967 | Henes | 431/2 X |
| 3,385,647 | 5/1968 | Miller et al. | 431/4 |

FOREIGN PATENTS OR APPLICATIONS

| 538,320 | 6/1922 | France | 431/2 |

*Primary Examiner*—Edward G. Favors

[57] ABSTRACT

To a mixture of hydrogen and oxygen or air having the stoichiometric oxygen-to-hydrogen ratio, a diluent gas such as carbon dioxide or argon is added before the mixture is fed to the combustor when the burning rate of the mixture is excessively high. The diluent in the combustion gas can be reused after separation of water.

11 Claims, 4 Drawing Figures

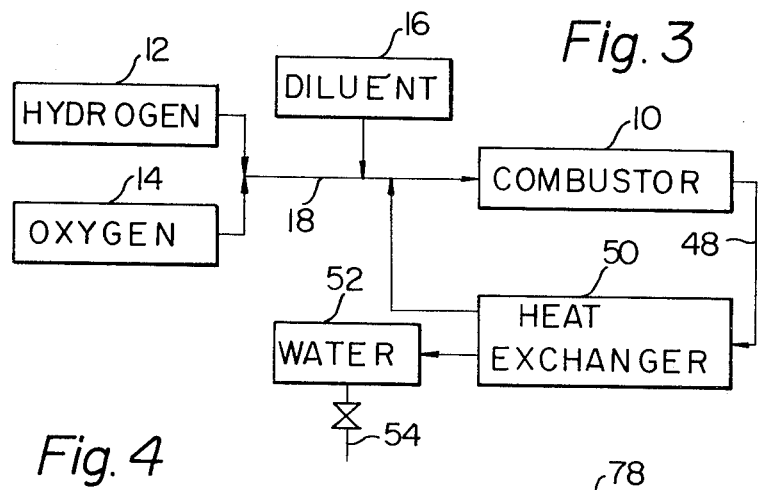
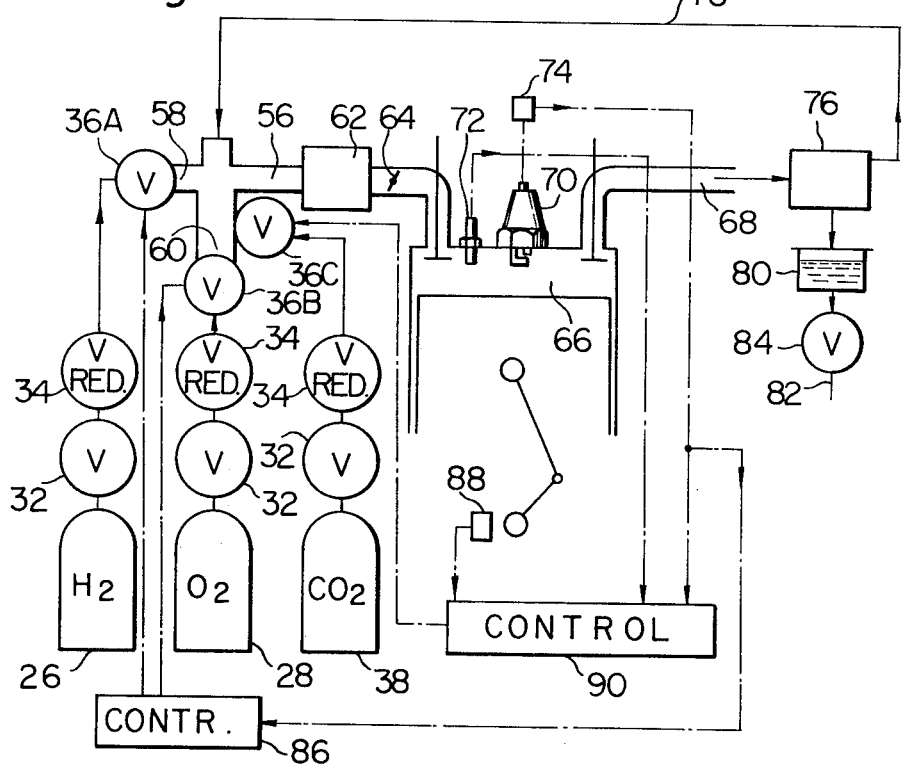

BURNING RATE CONTROL IN HYDROGEN FUEL COMBUSTOR

This invention relates to combustors which use hydrogen as fuel, and more particularly to a method of burning hydrogen in the described combustor at a controlled and relatively low burning rate and apparatus having a combustor of the described type and a system to introduce a diluent gas into the reaction system for the control of the burning rate.

In a gaseous fuel combustor of, e.g., a boiler, gas turbine or internal combustion engine, the maximum output is attained when the fuel is allowed to react with oxygen (which may be supplied in the form of air) at a stoichiometric mixing ratio. When the gaseous fuel is hydrogen, however, it is quite difficult to operate the combustor by the employment of the stoichiometric oxygen-to-hydrogen ratio because of excessively high burning rate and combustion temperature at the stoichiometric ratio.

It is an object of the present invention to provide a method of burning hydrogen at a controlled and relatively low burning rate in a combustor to which hydrogen and either oxygen or air are supplied at the stoichiometric mixing ratio.

It is another object of the invention to provide apparatus for burning a mixture of hydrogen and either oxygen or air, which apparatus has a conventional hydrogen fuel combustor but allows the control of the burning rate with maintenance of the stoichiometric oxygen-to-hydrogen ratio.

According to a method of the invention for burning hydrogen contained in a gaseous mixture of hydrogen and either oxygen or air at a controlled and relatively low burning rate in a combustor, the ratio of oxygen to hydrogen in the mixture is maintained at the stoichiometric ratio, and a gaseous diluent is added to the mixture outside the combustor. The diluent is a gaseous substance which has a heat conductivity not higher than the heat conductivity of nitrogen gas. The diluted mixture is fed to the combustor. Preferably, the aforementioned gaseous mixture is burned in the combustor without the addition of the diluent until the burning rate thereof increases to a predetermined level. Preferred examples of the diluent are carbon dioxide gas and argon gas. When oxygen is used as the oxidizer, the combustion gas may be deprived of water and reused as the diluent.

Apparatus for burning a gaseous mixture of hydrogen and either oxygen or air according to the invention comprises: a hydrogen fuel combustor; a fuel system to feed the aforementioned gaseous mixture of the stoichiometric oxygen-to-hydrogen ratio to the combustor; a diluent gas feed system to add a diluent gas to the above mixture before it is fed to the combustor; and a control means for operating the diluent gas feed system when the burning rate in the combustor is above a predetermined level. The apparatus may have a heat exchanger arranged to liquefy and remove water from the combustion gas discharged from the combustor, and a recirculation circuit for adding the dehydrated combustion gas to the mixture as the diluent gas.

The invention will be fully understood from the following detailed description of preferred embodiments thereof with reference to the accompanying drawings, in which:

FIG. 3 is a basic block diagram of apparatus for burning hydrogen which is fundamentally similar to that of FIG. 1, but includes an exhaust gas recirculation system; and FIG. 4 is a diagram of an internal combustion engine as an embodiment of the apparatus of FIG. 3.

Figure 1:
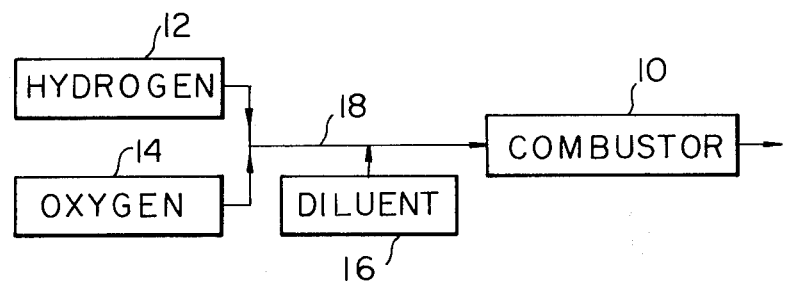
FIG. 1 is a basic block diagram of apparatus for burning hydrogen according to the invention.

In FIG. 1, a conventional hydrogen fuel combustor 10 is combined with a fuel system (no numeral) according to the invention which is fundamentally made up of a hydrogen supply source 12, an oxidizer supply source 14 and a diluent supply source 16. In the present invention, the oxidizer in the supply source 14 is either oxygen or air, but the former is preferred. The hyrogen and oxidizer sources 12 and 14 are arranged such that a gaseous mixture of hydrogen and oxidizer having the stoichiometric oxygen-to-hydrogen ratio is prepared in a feed line 18, and the diluent source 16 is arranged such that the diluent is added to the mixture in a controlled amount during the flow of the mixture in the feed line 18.

The diluent supply source 16 delivers a gaseous substance which has a heat conductivity not higher than that of nitrogen gas. According to this definition, nitrogen is useful as the diluent gas, but more preferred examples of the diluent are carbon dioxide gas and argon gas since either of them is inactive with the oxygen-hydrogen mixture and has a lower heat conductivity than nitrogen.

The ratio of oxygen to hydrogen in the gaseous mixture fed to the combustor 10 is kept at the stoichiometric ratio, but the burning rate of the mixture and combustion temperature in the combustor 10 can be lowered by the presence of the diluent from unfavorably high values with a stoichiometric oxygen (or air)-hydrogen mixture and can be regulated by the control of the amount of the diluent. The diluent may be added to the oxygen-hydrogen mixture from start of the operation of the combustor 10, but the addition is usually commenced after the oxygen-hydrogen mixture alone is burned for a certain period of time and when the burning rate of the mixture increases to a predetermined level. The addition of the diluent to the oxygen (or air)-hydrogen mixture has the advantage that the burning rate and the combustion temperature can be controlled without losing the profit of highest combustion efficiencies derived from the stoichiometric oxygen-to-hydrogen ratio. As an additional advantage, the diluent gas can be used as an effective fire extinguishing agent if a fire breaks out in the vicinity of the combustor 10.

When nitrogen is used as the diluent, a method according to the invention may seem not particularly distinct from conventional methods using an air-hydrogen mixture. In the case of an air-hydrogen mixture, however, the amount of nitrogen in the mixture is fixed when the oxygen-to-hydrogen ratio is fixed at the stoichiometric ratio. In a stoichiometric air-hydrogen mixture, the volumetric (molar) ratio of $O_2$ to $(O_2 + N_2)$ is about 0.2 and $H_2$ in the mixture amounts to about 29 Vol.%. As is known, the burning rate of this mixture is usually too high to operate a practical combustor other than a special one such as a rocket engine. It is frequently desired that the burning rate of a hydrogen-fuel mixture in a combustor is kept below about 100 cm/sec. With an $O_2$—$H_2$—$N_2$ mixture wherein the $O_2/H_2$ ratio is stoichiometric, the burning rate is below 100 cm/sec. If the volumetric ratio of $O_2$ to ($O_2 + N_2$) is below about 0.15, or the amount of $H_2$ is less than about 25 Vol.% of the mixture. With an $O_2$—$H_2$—$CO_2$ mixture wherein the $O_2/H_2$ ratio is stoichiometric, the same burning rate is attained when the volumetric ratio of $O_2$ to ($O_2 + CO_2$) is below about 0.3, or the amount of $H_2$ is less than about 35 Vol.% of the mixture.

Figure 2:
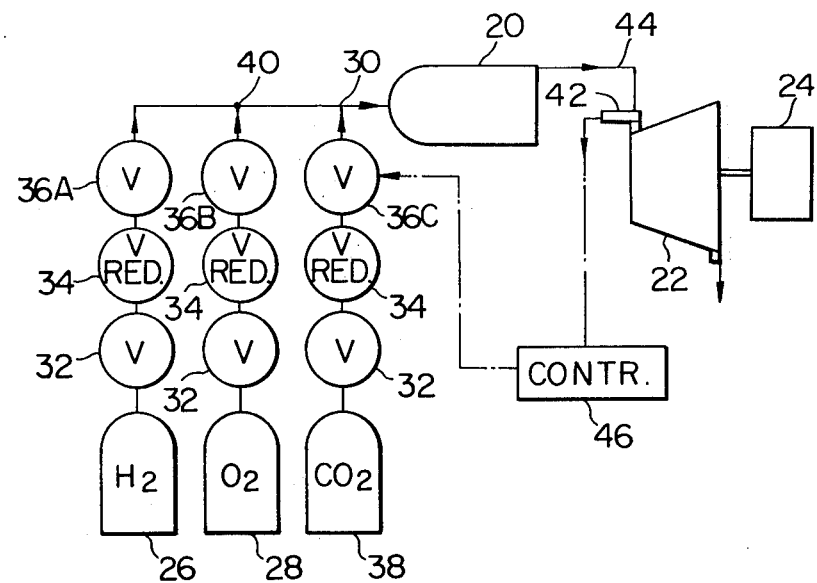
FIG. 2 is a diagram of a gas turbine as an embodiment of the apparatus of FIG. 1.

FIG. 2 shows a gas turbine system in accordance with the block diagram of FIG. 1. A combustor 20, a turbine 22 and a load 24 are arranged as usual. Two pressure vessels 26 and 28 which contain therein pressurized hydrogen and oxygen, respectively, are connected to the combustor 20 through a feed line 30. Each of the vessels 26 and 28 is equipped with a stop valve 32, a pressure regulator 34 and an electromagnetic valve 36A or 36B. Another pressure vessel 38 contains therein pressurized carbon dioxide gas as the diluent and is similarly equipped with the stop valve 32, pressure regulator 34 and an electromagnetic valve 36C. The carbon dioxide vessel 38 is arranged such that carbon dioxide gas enters the feed line 30 at a location downstream of a point indicated at 40 where hydrogen and oxygen gases meet with each other.

An electrical temperature sensor 42 is disposed in a conduit 44 for conducting the combustion gas from the combustor 20 to the turbine 22 at a location close to the inlet of the turbine 22. The turbine system has a control device 46 which governs the operation of the electromagnetic valve 36C for the control of a fluid flow from the carbon dioxide vessel 38 to the feed line 30.

At an initial stage of the operation, the electromagnetic valves 36A and 36B are opened, but the valve 36C is kept closed. In this state, a stoichiometric mixture of hydrogen and oxygen is fed to the combustor 20. A high temperature and high pressure combustion gas from the combustor 20 is fed to and expanded in the turbine 22. When the temperature of the combustion gas at the inlet of the turbine 22 reaches the highest operational temperature of the turbine 22, which depends on heat resistivities of the materials of the turbine elements typified by the blades, the control device 46 causes the electromagnetic valve 36C to open in response to the signal supplied from the sensor 42. Then, the hydrogen-oxygen mixture is mixed with carbon dioxide gas within the feed line 30. As a result, the burning rate of the hydrogen-oxygen mixture in the combustor 20 decreases, and the temperature of the combustion gas lowers.

The system of FIG. 1 may be combined with an exhaust gas recirculation circuit as shown in FIG. 3 particularly when oxygen is used as the oxidizer. The exhaust gas is conducted to a heat exchanger 50 through a recirculation conduit 48 and separated into water and a cooled gas. The water is temporarily stored in a water reservoir 52 and later discharged therefrom through a drain pipe 54. The cooled and dehydrated exhaust gas consists essentially of the diluent gas and is added to the hydrogen-oxygen mixture in the feed line 18. In this system, the supply of the diluent from the source 16 is needed only for a short period of time following the start of supply unless there occurs leak of the exhaust gas out of the system.

In FIG. 4, an internal combustion engine (no numeral) working on hydrogen fuel employs the fuel system and recirculation system of FIG. 3. An intake manifold 56 of this engine has a hydrogen inlet 58, an oxygen inlet 60, a mixing chamber 62 and a throttle valve 64 located downstream of the mixing chamber 62. A combustion chamber 66 of the engine is communicable with the intake manifold 56 and an exhaust manifold 68 through usual valves (no numeral) and equipped with a spark plug 70 and a combustion sensor 72 which detects the flame propagation speed in the combustion chamber 66. The ignition circuit (no numeral) of the engine includes a sensor 74 which detects application of each high voltage pulse to the spark plug 70. Hydrogen, oxygen and carbon dioxide (diluent) gases are supplied to the intake manifold 56 from the same supply sources 26, 28 and 38, respectively, as in the system of FIG. 2. The electromagnetic valves 36A and 36B for hydrogen and oxygen are connected to the hydrogen and oxygen inlets 58 and 60, respectively, and the electromagnetic valve 36C for carbon dioxide is connected to the intake manifold 56 preferably at a location upstream of the mixing chamber 62. The exhaust manifold 68 is connected to a heat exchanger 76, which in turn is connected to the intake manifold 56 at a location upstream of the mixing chamber 62 through a recirculation conduit 78. A water reservoir 80 is arranged to receive water from the heat exchanger 76 and provided with a drain pipe 82 and a stop valve 84. A control unit 86 is responsive to the signal from the sensor 74 and causes the electromagnetic valves 36A and 36B to open simultaneously and intermittently in synchronization with each high voltage pulse applied to the spark plug 70. The engine is equipped with an engine speed sensor 88 and a control device 90 for controlling the operation of the electromagnetic valve 36C. This control device 90 receives signals from the sensors 72, 74 and 88 and causes intermittent openings of the valve 36C simultaneously with the valves 36A and 36B when the burning rate of the hydrogen-oxygen mixture or the flam propagation speed in the combustion chamber 66 exceeds a predetermined value. The intermittent openings of the valve 36C can be stopped after a while either automatically or manually when recirculation of the exhaust gas reaches a stable state.

In operation, hydrogen and oxygen are fed intermittently to the intake manifold 56 in synchronization with the pulse applications to the spark plug 70, and a stoichiometric mixture of hydrogen and oxygen is prepared in the mixing chamber 62. The exhaust gas discharged from the combustion chamber 66 is cooled in the heat exchanger 76. When carbon dioxide gas is not fed to the intake manifold 56, the exhaust gas is almost entirely water vapor, so that little gas is discharged from the heat exchanger 76. When the valve 36C is opened by the control device 90 for reduction of the burning rate in the combustion chamber 66, a cooled and dehydrated gas, which is essentially carbon dioxide gas, is discharged from the heat exchanger 76 and recirculated to the intake manifold 56. Accordingly, the valve 36C needs not to be opened thereafter unless there occurs leak of the exhaust gas.

What is claimed is:

1. A method of burning hydrogen contained in a gaseous mixture of hydrogen and oxygen or air at a controlled and relatively low burning rate in a combustor, comprising the steps of: regulating the quantitative ratio of oxygen to hydrogen in said gaseous mixture to the stoichiometric ratio; adding a gaseous diluent to said gaseous mixture outside said combustor, said diluent having a heat conductivity not higher than the heat conductivity of nitrogen gas; and feeding the diluted mixture to said combustor.

2. A method as is claimed in claim 1, further comprising, in advance of the diluent addition, step, the step of burning said gaseous mixture in said combustor for a period of time until the burning rate of said gaseous mixture increases to a predetermined level.

3. A method as claimed in claim 2, wherein said gaseous mixture is a mixture of hydrogen and oxygen.

4. A method as claimed in claim 3, further comprising the step of: removing water from a combustion gas discharged from said combustor when said diluent is added to said gaseous mixture; and using the remaining part of said combustion gas as said diluent in the addition step.

5. A method as claimed in claim 1, wherein said diluent is carbon dioxide gas.

6. A method as claimed in claim 1, wherein said diluent is argon gas.

7. Apparatus for burning a gaseous mixture of hydrogen and oxygen or air, comprising:
a combustor;
means for feeding said gaseous mixture to said combustor, the ratio of oxygen to hydrogen in said gaseous mixture being the stoichiometric ratio; and
means for adding a gaseous diluent to said gaseous mixture before said gaseous mixture is fed to said combustor when the burning rate of said gaseous mixture in said combustor is above a predetermined level, said diluent having a heat conductivity not higher than the heat conductivity of nitrogen gas.

8. Apparatus as claimed in claim 7, further comprising:
means for liquefying water contained in a combustion gas discharged from said combustor and separating the remaining part of said combustion gas from the liquefied water; and means for adding said remaining part of said combustion gas to said gaseous mixture before said gaseous mixture is fed to said combustor.

9. Apparatus as claimed in claim 8, further comprising means for stopping the operation of the diluent addition means when the combustion gas addition means is in operation.

10. Apparatus as claimed in claim 7, wherein said diluent is carbon dioxide gas.

11. Apparatus as claimed in claim 7, wherein said diluent is argon gas.

* * * * *